United States Patent [19]

Rijsdijk

[11] 4,206,659

[45] Jun. 10, 1980

[54] VARIABLE V-BELT DRIVE FOR A VEHICLE

[75] Inventor: Jan Rijsdijk, Eersel, Netherlands

[73] Assignee: Volvo Car B.V., Geldrop-Eindhoven, Netherlands

[21] Appl. No.: 893,963

[22] Filed: Apr. 6, 1978

[30] Foreign Application Priority Data

Apr. 15, 1977 [NL] Netherlands ............................ 7704138

[51] Int. Cl.² ............................ G01F 1/06; G01F 1/10
[52] U.S. Cl. ........................ 74/230.17 E; 74/230.17 F; 74/868
[58] Field of Search ............... 192/4 A; 74/230.17 E, 74/230.17 F, 752 B, 751, 337, 865, 867, 868, 869, 336 R, 337.5

[56] References Cited

U.S. PATENT DOCUMENTS

| | | | |
|---|---|---|---|
| 2,529,743 | 11/1950 | Salsbury et al. | 74/230.17 E |
| 2,916,024 | 12/1959 | Dodge | 74/230.17 E |
| 2,982,147 | 5/1961 | Panhard | 74/865 |
| 2,997,144 | 8/1961 | Gsching et al. | 74/865 X |
| 3,017,783 | 1/1962 | Brugghen et al. | 74/230.17 E |
| 3,088,303 | 5/1963 | Schmettow | 74/230.17 E X |
| 3,088,327 | 5/1963 | Swigart | 74/230.17 F |
| 3,177,734 | 4/1965 | Rackelboom | 74/230.17 F |
| 3,368,426 | 2/1968 | Karig et al. | 74/865 |
| 3,401,582 | 9/1968 | Jaulmes | 74/230.17 F X |
| 3,478,611 | 11/1969 | Venne et al. | 74/230.17 E |
| 3,557,640 | 1/1971 | Hendriks | 74/230.17 F X |
| 3,600,961 | 8/1971 | Rattunde et al. | 74/230.17 F |
| 3,653,283 | 4/1972 | Betz | 74/230.17 F X |
| 3,698,256 | 10/1972 | Albertson | 74/230.17 E |
| 3,771,378 | 11/1973 | Knobel | 74/230.17 F X |
| 3,884,316 | 5/1975 | Bowers | 74/230.17 E X |
| 3,893,344 | 7/1975 | Dantlgraber et al. | 74/230.17 F |
| 3,906,808 | 9/1975 | Zaiser et al. | 74/230.17 E |
| 3,918,312 | 11/1975 | Espenschied et al. | 74/230.17 F |
| 3,939,732 | 2/1976 | Giacosa | 74/217 CV X |
| 4,091,690 | 5/1978 | Miyao | 74/867 X |

FOREIGN PATENT DOCUMENTS

| | | | |
|---|---|---|---|
| 194670 | 1/1958 | Austria | 74/230.17 F |
| 1214559 | 4/1960 | France | 74/230.17 F |
| 98095 | 4/1961 | Norway . | |
| 180683 | 9/1962 | Sweden | 74/230.17 E |
| 1200668 | 7/1970 | United Kingdom | 74/230.17 F |

Primary Examiner—Leslie Braun
Attorney, Agent, or Firm—Price, Heneveld, Huizenga & Cooper

[57] ABSTRACT

The variable V-belt drive for motor cars which up till this moment had the drawbacks that under many circumstances, especially when applying the brakes, the number of revolutions of the engine became uncomfortable high, resulting in an increased sound level, use of fuel, and transmission, has according to the invention then improved in the first place by that a switch responding to the number of revolutions influences the position of the movable disc of the primary pair of discs.

10 Claims, 6 Drawing Figures

VARIABLE V-BELT DRIVE FOR A VEHICLE

The invention relates to a variable V-belt drive for a vehicle, particularly a motor car, consisting of a combustion engine and at least one V-belt transmission, comprising a V-belt extending over a primary and a secondary pair of discs having a fixed center distance and variable disc opening, centrifugal weights taking care of the adjustment of the transmission ratio between the pairs of discs and the tension force being provided by springs pinching shut the secondary pair of discs, it being possible for the centrifugal weights, in the equilibrium situation, to provide less force owing to the application of an additional compressive force on the primary discs and it being guaranteed by the increase of the speed of the changing down of the gear by the control of the pressure in a outer or an inner chamber of the movable disc of the primary pair of discs that the V-belt in case of deceleration is completely changed down before the vehicle stops.

Such a drive is known from Netherlands Pat. No. 98 095. In this known drive the centrifugal weights, at a certain number of revolutions of the engine, provide as much coaxial force as is necessary to provide an equilibrium with the secondary elasticity. This number of revolutions of the engine has been chosen such, to wit at about 4000 rev/min, that an optimum performance can be delivered. However, a high number of revolutions of the engine is unfavorable for the comfort, particularly the sound level, the use of fuel and the emission. Furthermore the speed of changing down the gear of the V-belt in a few cases is too high in proportion to the deceleration in the known drive, due to which the number of revolutions of the engine increases. This also is very unfavorable in view of comfort, use of fuel and emission. In the known drive it, furthermore, is so that when accelerating from standstill no sub-pressure can be supplied to the transmission because, in that case, the engine is not available as a source of sub-pressure.

The invention aims at eliminating the above-mentioned problems and drawbacks.

According to the invention this has been achieved in that a switch responding to the number of revolutions influences the position of the movable disc of the primary pair of discs. For this influencing there are two possibilities in principle. In the first place the switch responding to the number of revolutions can remove the sub-pressure in the outer chamber of the movable disc of the primary pair of discs below a certain number of revolutions of the engine and bring it about again above that number, whereas, in the second place, it is possible that the switch responding to the number of revolutions brings about the sub-pressure moreover in the inner chamber of the movable disc of the primary pair of discs below a certain number of revolutions of the engine and removes it again above it. The above-mentioned certain number of revolutions of the engine, preferably is in the vicinity of 1800 rev/min.

Furthermore, it is preferred that a brake pressure switch is provided which sends sub-pressure to the inner chamber at a higher brake conduit pressure only and removes sub-pressure in the outer chamber. This brake pressure switch, preferably, is adjusted at a brake conduit pressure of about 15–20 bars.

In order to achieve the above mentioned purpose of the invention it is suggested that a vacuum tank be present for the supply of sub-pressure to the outer chamber when accelerating from standstill.

The invention will be further elucidated herebelow by way of the drawing in which, by way of example, a number of embodiments of the drive according to the invention is represented. In the drawing.

Figure 1:
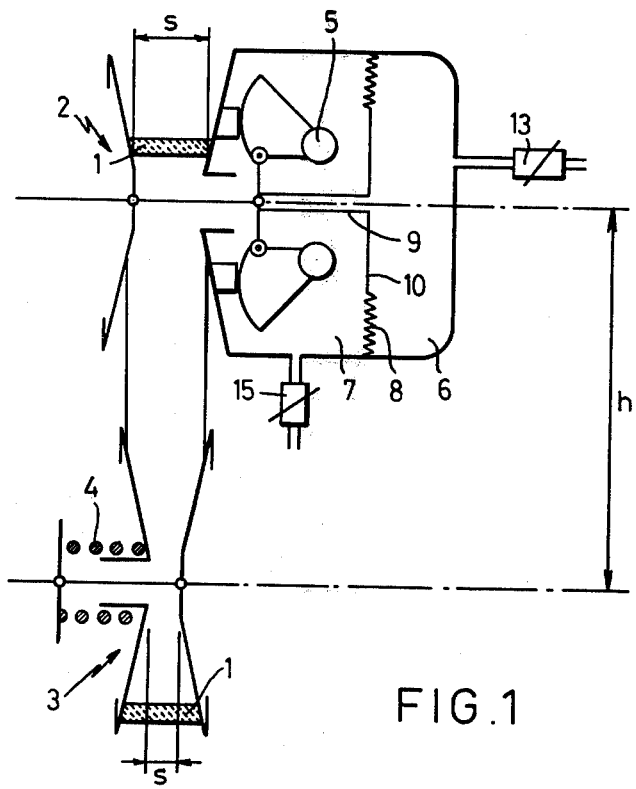
FIG. 1 is a diagrammatic plan view of a V-belt transmission which, for the rest, is unchanged in respect of the known state of the art.

In FIG. 1 a V-belt 1 is represented which is positioned over a primary pair of discs 2 at the side of the (not shown) engine and a secondary pair of discs 3 situated at the wheel side with a mutual fixed center distance h and a variable disc opening s. When the belt 1 lies between the primary pair of discs 2 on the smallest diameter, it lies on the largest diameter between the secondary pair of discs 3. By moving the belt at the engine side to a larger diameter, and, consequently to a smaller diameter at the wheel side the transmission ratio changes.

Figure 2:
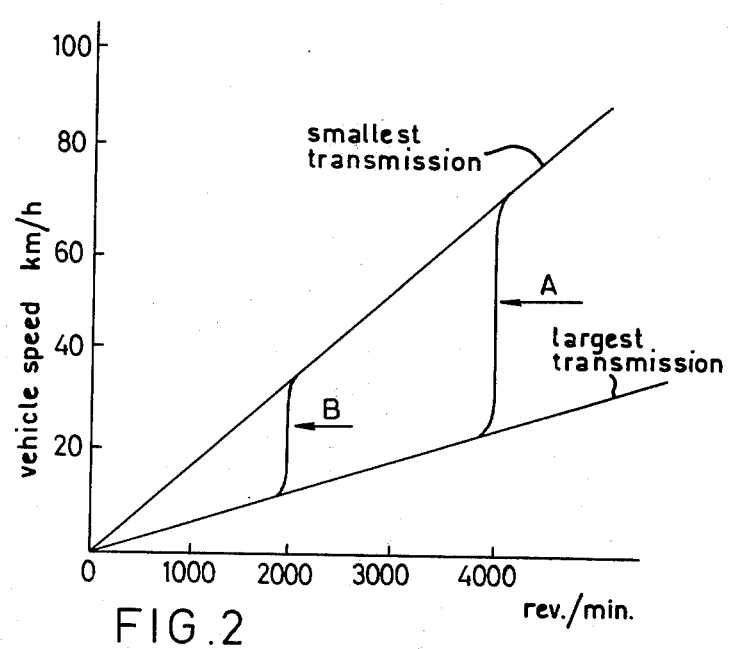
FIG. 2 is a graph in which the largest and the smallest transmission of a stepless transmission of FIG. 1 are plotted in respect of the number of revolutions of the engine and the speed of the vehicle.

In order to be able to transmit power the belt 1 should be tensioned between the pairs of discs. The tension force is determined by springs 4 pinching shut the secondary discs. The centrifugal weights 5 in the primary pair of discs take care of the adjustment of the transmission ratio. At a certain number of revolutions of the engine these weights provide as much axial force as is necessary to provide equilibrium with the secondary elasticity. This number of revolutions of the engine has been chosen such, namely at about 4000 rev/min, that an optimum performance can be provided. With this construction the speed of the vehicle, consequently, increases according to the curve A of FIG. 2, the V-belt transmission changing from the largest transmission to the smallest transmission.

A high number of revolutions is unfavorable for the comfort, particularly the sound level, the use of fuel and the emission. By the application of an additional pressure force on the movable disc of the primary pair of discs it is possible for the centrifugal weights in the equilibrium situation to provide less force. The number of revolutions then is lower, e.g. at about 2000 rev/min, as indicated by the line B in FIG. 2.

Because the changing speed of the belt is slight and the belt cannot even shift at standstill, the equilibrium situation is emphatically spoken of. In case of deceleration care should always be taken that the belt is completely changed down before the vehicle has come to standstill. The changing down speed can be increased by removing the sub-pressure in the outer chamber 6 of the movable disc of the primary pair of discs 2 and/or by supplying the sub-pressure to the inner chamber 7 which corresponds with an additional tensile force.

The chambers 6 and 7 are separated in known way by a diaphragm 8 which absorbs the displacement between the plate 10, connected with the movable disc of the pair of discs 2 by means of a shaft 9 and the common housing of the chambers 6 and 7. Instead of the diaphragm 8 and the plate 10 use can be made also of a piston.

Concerning the known arrangement the following pronouncements can be made in respect of the being in force or not of sub-pressure:

|  | Outer chamber 6 | Inner chamber 7 |
|---|---|---|
| Kick down (throttle completely opened and surmounting of additional elasticity) | none | none |
| throttle opened | yes | none |
| throttle closed | none | none |
| brake pedal operated | none | yes |

Figure 3:
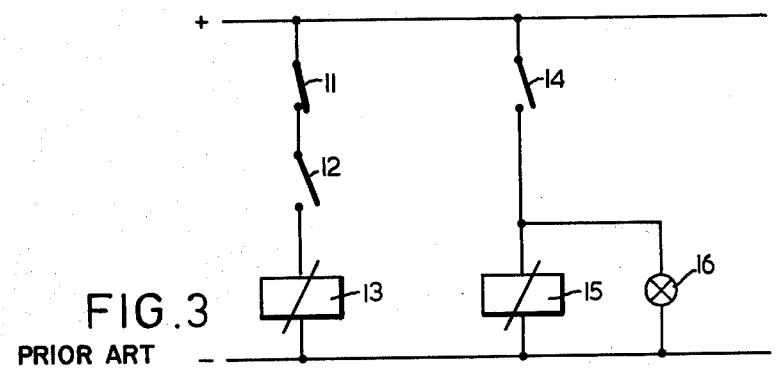
FIG. 3 is a survey contained in an electric diagram of the operation of the known transmission.

Although the kick-down member, the choke and the brake pedal substantially never are electric components and, in fact, the brake pedal has an electric connection for operating the brake lights, the above-mentioned pronouncements, with a view to the surveyability, could yet be presented in the electric diagram of FIG. 3 in which between a plus-conduit and the mass, on the one hand, in series a kick-down switch 11, a throttle switch 12 and a coil valve 13 for the control of the sub-pressure in the outer chamber 6 and, on the other hand, in parallel therewith in series a brake light switch 14 and a coil valve 15 for the control of the sub-pressure in the inner chamber 7 are represented. The brake light 16 then is in parallel with the coil valve 15.

In the above-described configuration the changing down speed of the V-belt 1 is too great in some cases in relation to the deceleration owing to which the number of revolutions of the engine increases uncomfortably. Also with a view to fuel consumption and emission of exhaust gases this is unfavorable. When driving, e.g. with 2000 rev/min at 40 km/h the deceleration when closing the throttle may be slight at said low speed, e.g. owing to the wind direction or a slope in the road. By the closing of the throttle (or the opening of the throttle switch 12) the sub-pressure in the outer chamber 6 yet is removed, due to which the belt starts changing down. When the throttle is closed (or the throttle switch 12 opened) and the brake (or brake light switch 14) is operated without effecting an appreciable slowing down the belt switches back just as much as is necessary at very great slowings down. This is undesirable in a large speed area.

When the vehicle has come to a standstill the belt cannot shift anymore (self-braking). In order to prevent "driving off problems" the belt always should be completely changed down during the deceleration. Therefore a great changing speed is necessary in case of great slowings down.

Figure 4:
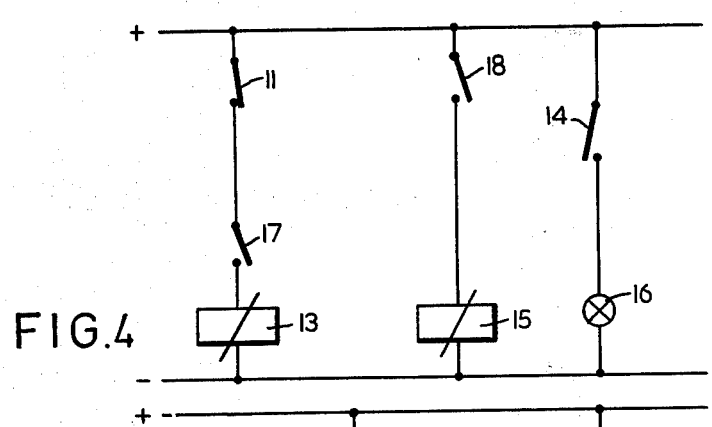
FIG. 4 is the same as in FIG. 3 but amended according to a first embodiment of the invention.

The above-mentioned drawbacks are eliminated in the way indicated in FIG. 4, the choke switch 12 of FIG. 3 being replaced by an electrically operating switch 17 for the number of revolutions which is capable of removing the sub-pressure in the outer chamber 6 below a certain number of revolutions and supplying it again above it and a high-pressure-brake pressure switch 18 replacing the brake light switch 14. The "switch" dependent so far on the position of the throttle gave a relatively great hysteresis owing to which it was necessary to change over higher numbers of revolutions in order to prevent that the transmission cannot change down completely anymore at great slowings down.

If desired, also the sub-pressure in the inner chamber 7 can be controlled by the switch 17 responding to the number of revolutions. This has, as a disadvantage for the present pneumatic construction, that in case of slight deceleration a perceptible changing up and down (of the number of revolutions of the engine) is obtained.

In order to avoid this effect the brake light switch 14 can be incorporated in the "circuit" of the coil valve 13 of the outer chamber 6.

Figure 5:
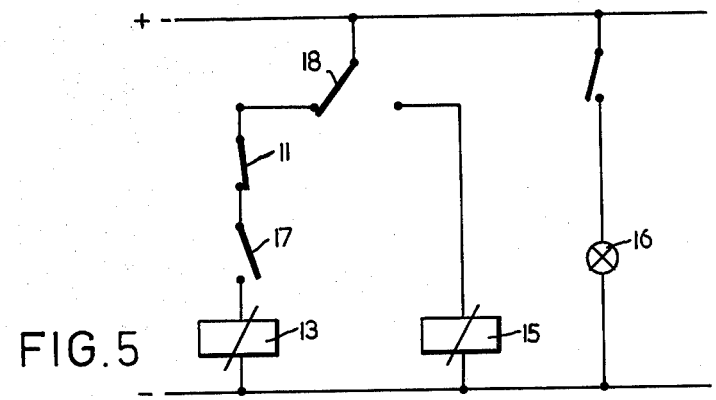
FIG. 5 is the same as in FIG. 3 but amended according to a second embodiment of the invention and FIG. 6 is a block diagram in which the location of the vacuum tank according to the invention is diagrammatically represented.

FIG. 5 gives an embodiment in which the high-pressure-brake pressure switch 18 not only sends a vacuum to the inner chamber but also removes the vacuum from the outer chamber.

This configuration provides a maximum changing down speed of the V-belt.

Figure 6:
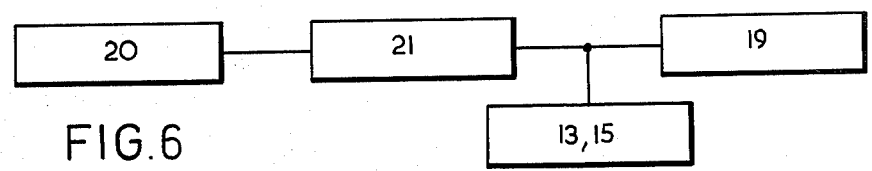

In all cases in which no kick-down signal is present the sub-pressure should be supplied to the outer chamber 6. When, however, the choke is opened far enough and still no sub-pressure is present, e.g. during accelerating from standstill, no sub-pressure can be supplied because the engine, as source, has not sub-pressure available. By using a vacuum tank 19 in the manner diagrammatically represented in FIG. 6 provision can be made herefor. The tank 19 is adjusted at sub-pressure by the vacuum of the engine 20 by means of a non-return valve 21, so that the valves 13 and 15 always can produce sub-pressure when there is a need for it. By this it is achieved that during accelerating from standstill the same behavior of the drive is obtained as when accelerating from, e.g. 50 km/h, to wit, the earlier arrival at the highest control line of the stepless transmission, consequently in FIG. 2 via line B instead of via line A.

Within the scope of the claims are comprised also other embodiments than those represented in the drawings.

What is claimed is:

1. A V-belt transmission for a motor vehicle comprising:
 a primary pair of discs, including one displaceable disc and one fixed disc;
 a secondary pair of discs;
 said primary and secondary pairs of discs having a fixed center distance and variable disc openings;
 a V-belt extending over said primary and secondary pairs of discs;
 spring biasing means for pinching said secondary pair of discs together thereby maintaining the tension of said V-belt;
 centrifugal weight means for varying the disc opening of said primary pair of discs, said centrifugal weight means overcoming said spring biasing means for creating a first compressive force during acceleration for urging said displaceable disc toward said fixed disc whenever a first predetermined RPM is exceeded and thereby effecting a reduction in transmission drive ratio above said first predetermined RPM;
 inner and outer pressure chambers associated with said displaceable disc for urging said displaceable disc toward or away from said fixed disc by varying the pressure in said inner and outer pressure chambers;
 brake actuated means for applying manifold pressure to said pressure chambers during deceleration to provide an expansive force to said primary pair of discs and thereby ensure a rapid and complete increase in transmission drive ratio when the motor vehicle is brought to a standstill;

an engine RPM actuated means sensitive to a second predetermined RPM, lower than said first predetermined RPM and higher than the idle RPM of the engine, for varying the pressure in said pressure chambers to create a second compressive force preventing an increase in transmission drive ratio above said second predetermined RPM effectively lowering the shift point of the transmission during deceleration.

2. The V-belt transmission of claim 1 wherein said engine RPM actuated means removes manifold pressure from said outer pressure chamber of said displaceable disc of said primary pair of discs below said second predetermined RPM and applies manifold pressure to said outer pressure chamber above said second predetermined RPM.

3. The V-belt transmission of claim 1 wherein said engine RPM actuated means supplies manifold pressure to said inner chamber of said displaceable disc of said primary pair of discs below said second predetermined RPM and removes manifold pressure from said inner chamber above said second predetermined RPM.

4. The V-belt transmission of claims 1, 2 or 3 wherein said second predetermined RPM is equal to approximately 1800 RPM.

5. The V-belt transmission of claim 4 further including a vacuum tank for supplying manifold pressure during acceleration from a standstill.

6. The V-belt transmission of claim 3 wherein said brake actuated means for applying manifold pressure comprises a brake actuated switch means for applying manifold pressure to said inner chamber of said displaceable disc at a predetermined brake pressure.

7. The V-belt transmission of claim 6 wherein said brake actuated means also removes manifold pressure from said outer chamber of said movable disc at said predetermined brake pressure.

8. The V-belt transmission of claims 6 or 7 wherein said predetermined brake pressure is approximately 15 to 20 bars.

9. The V-belt transmission of claims 1, 2, 3, 6 or 7 further including a vacuum tank for supplying manifold pressure during acceleration from a standstill.

10. The V-belt transmission of claim 6 further including a vacuum tank for supplying manifold pressure during acceleration from a standstill.

* * * * *